United States Patent [19]

Dietlein et al.

[11] Patent Number: 4,719,251

[45] Date of Patent: Jan. 12, 1988

[54] SILICONE WATER BASE FIRE BARRIERS

[75] Inventors: John E. Dietlein, Bay City; Jack R. Harper, Midland, both of Mich.

[73] Assignee: Dow Corning Corporation, Midland, Mich.

[21] Appl. No.: 766,620

[22] Filed: Aug. 19, 1985

[51] Int. Cl.$^4$ .......................... C08J 9/32; C08K 7/26; C08K 7/02; C08L 83/04

[52] U.S. Cl. ................................ 523/218; 524/538; 524/791; 524/863; 523/220; 523/179

[58] Field of Search ................ 523/218, 220, 179; 524/538, 791, 863

[56] References Cited

U.S. PATENT DOCUMENTS

| | | | |
|---|---|---|---|
| 3,317,455 | 5/1967 | Blome | 523/218 |
| 3,623,904 | 11/1971 | Ramseyer | 117/135.1 |
| 4,112,179 | 9/1978 | Maccalous | 523/218 |
| 4,259,455 | 3/1981 | Hitchcock | 521/122 |
| 4,286,013 | 8/1981 | Daroga | 428/266 |
| 4,433,069 | 2/1984 | Harper | 521/99 |
| 4,505,953 | 3/1985 | Meddaugh | 427/393 |

FOREIGN PATENT DOCUMENTS

| | | | |
|---|---|---|---|
| 54-31433 | 3/1979 | Japan | 523/218 |
| 58-161985 | 9/1983 | Japan | 523/218 |
| 2076833 | 12/1981 | United Kingdom | 523/218 |
| 834008 | 5/1981 | U.S.S.R. | 523/218 |
| 1058951 | 12/1983 | U.S.S.R. | 523/218 |

OTHER PUBLICATIONS

U.S. application Ser. No. 665,224, filed Oct. 26, 1984.

*Primary Examiner*—C. Warren Ivy
*Attorney, Agent, or Firm*—Edward C. Elliott

[57] ABSTRACT

An aqueous silicone emulsion useful in forming a fire barrier consists essentially of a mixture of anionically stabilized silicone emulsion, expanded vermiculite, and fiber selected from the group consisting of ceramic fiber and aramid fiber. The trowelable composition is applied to fill cracks or openings in fire walls to seal the wall and then allowed to dry. The dried material seals the opening it occupies. Upon exposure to fire, the dried material forms a char on its surface which protects the material under the surface and maintains a seal in the wall.

11 Claims, No Drawings

SILICONE WATER BASE FIRE BARRIERS

BACKGROUND OF THE INVENTION

1. Field of the Invention

This invention relates to a one-part, water based, silicone elastomeric composition useful as a fire barrier.

2. Background Information

Ramseyer, in U.S. Pat. No. 3,623,904, issued Nov. 30, 1971, disclosed a method of protecting aerospace vehicles by coating with a composition of silicone elastomer, silicon carbide, silica, and high temperature decomposing fiber such as carbon fiber. The fibers prevent the char from flaking off when the coating is subjected to the high temperatures and velocities encountered upon reentry to the earth's atmosphere.

An improved fire retardant siloxane foam is taught by Hitchcock in U.S. Pat. No. 4,259,455, issued Mar. 31, 1981, which adds aluminum silicate as a ceramic fiber to a composition of organohydrogensiloxane, hydrated organosiloxane, and platinum catalyst. The fiber is preferably a milled fiber. The fiber makes up from about 30 percent to about 40 percent by weight of the total composition.

Daroga et al. describe in U.S. Pat. No. 4,286,013, issued Aug. 25, 1981, a lightweight sheet useful as a flame barrier which comprises a sheet having a coating of diorganopolysiloxane gum, fibrous filler, hollow glass microspheres, and curing agent. The fibers, typically 700 micrometers long, improve the coherence of the coating when exposed to flame.

A cured polyorganosiloxane foam exhibiting high resistance to burn through and disintegration when exposed to flame is disclosed in U.S. Pat. No. 4,433,069, issued Feb. 21, 1984, to Harper. The cured foam contains at least 5 parts by weight of platinum per million parts by weight of foam with at least 0.1 percent by weight of at least one finely divided non-metallic, fibrous heat resistant material, and at least 0.1 percent by weight of at least one finely divided non-metallic, cellular heat resistant material dispersed in a cured, cellular polydiorganosiloxane. The combined concentrations of fibrous and cellular heat resistant materials do not exceed 40 percent by weight of the total weight of the foam. The preferred method of making the foam forms a homogeneous reactive composition by blending together at least one organohydrogensiloxane, at least one hydroxyl compound, and at least one polydiorganosiloxane with the above ingredients.

A composition of mineral particles bound with silicone elastomeric emulsion is taught by Meddaugh in U.S. Pat. No. 4,505,953, issued Mar. 19, 1985. The mixture of aqueous silicone elastomeric emulsion and mineral particles is useful as a coating. The cured coating has flame retardant properties.

Silicone foams have been produced from aqueous emulsions of silicone polymer. A method disclosed in U.S. patent application Ser. No. 665,224, filed Oct. 26, 1984 assigned to the assignee of the instant application and now U.S. Pat. No. 4,572,917, makes use of organic fibers to stabilize a froth formed of silicone emulsion and fibers which dry to give a foam.

One of the most successful methods of producing flame resistant coatings combines polydiorganosiloxane as a binder that is cured in the presence of platinum, preferably using the platinum as the curing catalyst. This method, although effective, is very expensive because of the cost of the platinum. A method of producing flame retardant coatings and sealants without the use of platinum is desired. It is also desirable to be able to apply coatings in thicknesses of greater than 10 mm to provide flame resistance for long periods of time, hours for example, without the coating material cracking during exposure to flame. An economical material that could be stored in one part and then be used to fill openings in fire walls to prevent the passage of fire and smoke through the wall that was easy to apply was needed.

SUMMARY OF THE INVENTION

A composition consisting essentially of a mixture of anionically stabilized silicone emulsion which cures upon drying at ambient temperature to an elastomeric film, expanded vermiculite, and fibers selected from the group consisting of ceramic fiber and aramid fiber forms a trowelable, non-slump mixture which is useful in forming fire barriers. The composition can be troweled into openings in a fire rated wall and allowed to dry with no noxious or flammable by-products being given off. The composition dries without cracking or shrinking appreciably so that openings are sealed. The dried material does not burn or support combustion so that an effective fire barrier is formed.

It is an object of this invention to produce a water based composition which can be troweled into place and dried at ambient temperature without cracking or shrinking, to form a material which does not burn or support combustion, for use as a fire barrier.

DESCRIPTION OF THE INVENTION

This invention claims a composition, useful as a fire barrier, consisting essentially of a mixture of (A) 100 parts by weight of an anionically stabilized silicone emulsion which is an aqueous, oil-in-water emulsion that cures upon drying at ambient temperature to an elastomeric film, the emulsion having a solids content of greater than 50 percent by weight, (B) greater than 5 parts by weight of an expanded vermiculite, and (C) greater than 0.2 parts by weight of fiber selected from the group consisting of ceramic fiber and aramid fiber, the composition being an emulsion having a viscosity such that it is trowelable and non-slump and capable of producing a cured, continuous fire barrier at a thickness of 10 mm when the water is removed at room temperature.

Compositions which are in the form of extrudable sealants, liquids which form a foam, coatings which are fire retardant, and cured sheeting which is fire retardant have been known. A two-part composition which is mixed and poured into place to form a foam has been commercially successful. Because the product must be mixed and once mixed reacts, there is some problem with wasted material because of poor mixing or mixing too much material for the space to be filled. The composition is expensive because of the ingredients necessary. A lower cost, simpler to use composition was desired.

It has been determined that a composition based upon an anionically stabilized silicone emulsion containing expanded vermiculite filler and non-flammable fibers can be formulated in the form of a trowelable, non-slump composition. The composition can be used to fill cracks or openings, in fire rated walls for example, or it can be stored in a common sealant tube and applied by extruding into place with a sealant gun. Once in place, the composition dries as the water present evaporates, without cracking or shrinking to a significant extent to provide a seal in the crack or opening. Upon exposure to fire, the composition forms a char on its surface which protects the material under the surface. The char formed does not fall off of the surface either during flame exposure or after the flame exposure. The term "continuous fire barrier" as used in this application means that the composition, when applied at a thickness of 10 mm, does not crack when the water is removed from the composition.

The elastomeric polymer which forms the binder of this invention comes from the oil-in-water emulsion of (A). Emulsion (A) has to be stable so that the mixture has a useful shelf life, for example, 1 year. Emulsion (A) has to be convertible to an elastomer upon removal of the water at room temperature. The emulsion is required to have a solids content of greater than 50 percent by weight for use in this invention. Solids content is the percent by weight of non-volatile material remaining in a 2 g sample of the emulsion after it has been heated for 1 hour at 150° C. in an air-circulating oven. The sample is in an aluminum foil dish 60 mm in diameter and 15 mm deep. The upper limit of the solids content is determined by the requirement of an oil-in-water emulsion. About 20 percent by weight of water is necessary in order to maintain the emulsion because of the tendency of the emulsion to thicken and/or gel on storage when lower amounts of water are present.

There are many different types of elastomeric silicone emulsions which have the required characteristic so that they can be used as (A). A silicone emulsion having a dispersed phase of an anionically stabilized hydroxylated polydiorganosiloxane and a colloidal silica and a continuous phase of water in which the pH is 9 to 11.5 as described in U.S. Pat. No. 4,221,688, issued Sept. 9, 1980, to Johnson et al. is a preferred emulsion for use in this invention as (A). U.S. Pat. No. 4,221,688 is hereby incorporated by reference to disclose the emulsion and method of manufacture of such an emulsion. Hydroxylated polydiorganosiloxanes are those which impart elastomeric property to the product obtained after removal of the water from the emulsion. They should have a weight average molecular weight of at least 5,000, preferably in a range of 200,000 to 700,000. The organic radicals of the hydroxylated polydiorganosiloxane can be monovalent hydrocarbon radicals containing less than seven carbon atoms per radical and 2-(perfluoroalkyl)ethyl radicals containing less than seven carbon atoms per radical. The hydroxylated polydiorganosiloxanes preferably contain at least 50 percent methyl radicals with polydimethylsiloxane being preferred. The hydroxylated polydiorganosiloxanes are preferably those which contain about 2 silicon-bonded hydroxyls per molecule.

The most preferred hydroxylated polydiorganosiloxanes are those prepared by the method of anionic emulsion polymerization described by Findley et al. in the U.S. Pat. No. 3,294,725 which is hereby incorporated by reference to show the methods of polymerization and to show the hydroxylated polydiorganosiloxane in emulsion. Another method of preparing hydroxylated polydiorganosiloxane is described by Hyde et al. in U.S. Pat. No. 2,891,920 which is hereby incorporated by reference to show the hydroxylated polydiorganosiloxanes and their method of preparation.

The optional organic tin compound is preferably a diorganotindicarboxylate in an amount of from 0.1 to 2 parts by weight per 100 parts by weight of polydiorganosiloxane. Preferred diorganotindicarboxylates include dibutyltindiacetate, dibutyltindilaurate, and dioctyltindi- laurate.

Another emulsion useful as (A) of this invention is described in U.S. Pat. No. 4,244,849 issued Jan. 13, 1981, to Saam, hereby incorporated by reference to disclose the emulsion and method of manufacture of such an emulsion. This emulsion comprises a continuous water phase and an anionically stabilized dispersed silicone phase which is a graft copolymer of a hydroxyl endblocked polydiorganosiloxane and an alkali metal silicate which is present in the continuous water phase. The emulsion has a pH within the range of 8.5 to 12 inclusive. The hydroxyl endblocked polydiorganosiloxane useful in this embodiment is the same as that described above. The alkali metal silicates that are suitable are water soluble silicates, preferably employed as an aqueous solution. Preferred is sodium silicate in an amount of from 0.3 to 30 parts by weight for each 100 parts by weight of polydiorganosiloxane. During the preparation of the emulsion, an organic tin salt is added to catalyze the reaction of the hydroxyl endblocked polydiorganosiloxane and the alkali metal silicate. A diorganotindicarboxylate is a preferred organic tin salt with from 0.1 to 2 parts by weight employed for each 100 parts by weight of polydiorganosiloxane. The preferred diorganotindicarboxylate is dioctyltindilaurate.

Another emulsion useful as (A) of this invention is described in U.S. Pat. No. 4,248,751, issued Feb. 3, 1981, to Willing, hereby incorporated by refererce to disclose the emulsion and its method of manufacture. For use in this invention, the emulsion includes the addition of colloidal silica. This emulsion is the emulsion produced by a process comprising emulsifying (5) a vinyl endblocked polydiorganosiloxane and (6) an organosilicon compound having silicon-bonded hydrogen atoms using water and surfactant to form an emulsion, adding a platinum catalyst and heating the emulsion to form a dispersed phase of crosslinked silicone elastomer, then adding colloidal silica. The vinyl endblocked polydiorganosiloxane (5) preferably is a polydiorganosiloxane terminated by triorganosiloxy groups and having two vinyl radicals per molecule, no silicon atom having more than one vinyl radical bonded thereto. The remaining organic radicals are preferably those with six carbon atoms or less with the preferred organic radicals being selected from the group consisting of methyl, ethyl, phenyl, and 3,3,3-trifluoropropyl radicals, at least 50 percent of the radicals being methyl radicals. The polydiorganosiloxane should have a viscosity of from 0.1 to 100 Pa·s at 25° C.

In this embodiment, the organosilicon compound (6) is one which contains silicon-bonded hydrogen atoms. This compound can be any compound or combination of compounds containing silicon-bonded hydrogen atoms useful as crosslinkers and providing an average of at least 2.1 silicon-bonded hydrogen atoms per molecule of (6). Such compounds are known in the art as illustrated in U.S. Pat. No. 3,697,473, issued Oct. 10, 1972, to Polmanteer et al., which is hereby incorporated by reference to show such organosilicon compounds. A preferred organosilicon compound is a mixture which consists essentially of (a) an organosiloxane compound containing two silicon-bonded hydrogen atoms per molecule and the organic radicals being selected from the group consisting of alkyl radicals having from 1 to 12 carbon atoms inclusive, phenyl, and 3,3,3-trifluoropropyl radicals, no silicon atom having bonded thereto more than one silicon-bonded hydrogen atoms, and said organosiloxane (a) having no more than 500 silicon atoms per molecule, and (b) an organosiloxane compound containing at least 3 silicon-bonded hydrogen atoms per molecule, the organic radicals being selected from the group defined above for R', no silicon atom having bonded thereto more than one silicon-bonded hydrogen atom and said organosiloxane compound (b) having no more than 75 silicon atoms per molecule. This mixture is such that at least 10 percent of the silicon-bonded hydrogen atoms are derived from (a) or (b) and the combination of (a) and (b) provides 100 weight percent of the mixture. The organosilicon compound is preferably added in an amount such that there are present from 0.75 to 1.50 silicon-bonded hydrogen atoms in the compound (6) for each vinyl radical in the vinyl endblocked polydiorganosiloxane (5).

Another emulsion useful in part (A) of this invention is described in U.S. Pat. No. 4,273,634, issued Jun. 16, 1981, to Saam et al. which is hereby incorporated by reference to show the emulsion and the method of manufacture of an emulsion useful in this invention when colloidal silica is also present in the emulsion. The emulsion of this embodiment comprises an emulsion prepared by first forming a stabilized dispersion of hydroxyl endblocked polydiorganosiloxane containing sufficient vinyl substituted siloxane units to facilitate the crosslinking of the polydiorganosiloxane and having a weight average molecular weight of at least 5000. The preferred weight average molecular weight is in the range of from 200,000 to 700,000. The organic radicals of the hydroxyl endblocked polydiorganosiloxane can be monovalent hydrocarbon radicals containing less than seven carbon atoms per radical and 2-(perfluoroalkyl)ethyl radicals containing less than seven carbon atoms per radical. It is preferred that at least 50 percent of the radicals are methyl radicals with a preferred polydiorganosiloxane being a copolymer containing dimethylsiloxane units and methylvinylsiloxane units. The amount of vinyl-substituted siloxane units is not critical, typically about 0.03 to 0.06 mole percent of the vinyl-substituted siloxane units are preferred.

A preferred method of forming the stabilized dispersion is to prepare the polydiorganosiloxane by emulsion polymerization, preferably by the method of U.S. Pat. No. 3,294,725 cited above.

After the dispersion of hydroxyl endblocked polydiorganosiloxane containing vinyl substituted siloxane units have been made, it is treated to provide a crosslinking action by forming free radicals within the dispersed polydiorganosiloxane. Any of the methods known in the art to produce free radicals that will crosslink the polydiorganosiloxane can be employed in the present invention as long as the free radicals can be generated within the dispersed particles without breaking or coagulating the dispersion. Generally, crosslink-inducing radicals can be produced by energy activation of the polydiorganosiloxane directly or by energy activation of radical-producing agents dissolved in the droplets.

After the polydiorganosiloxane in the emulsion is crosslinked, colloidal silica is added to the emulsion, preferably in the form of an aqueous dispersion of colloidal silica. The amount of colloidal silica is not critical, up to 70 parts can be added with a preferred amount from about 10 to 25 parts by weight of colloidal silica per 100 parts by weight of polydiorganosiloxane.

Another emulsion useful in (A) of this invention is described in the patent application, Ser. No. 624,545, titled "Polydiorganosiloxane Latex", by Huebner and Saam, filed on Jun. 26, 1984, and having the same assignee, which is hereby incorporated by reference to describe the emulsion and its method of manufacture. In this method of producing an aqueous emulsion of crosslinked polydiorganosiloxane, a hydroxyl endblocked polydiorganosiloxane is mixed with a hydrolyzable silane having 3 or 4 hydrolyzable groups, a surface active anionic catalyst selected from the group consisting of a compound of the formula $R'C_6H_4SO_3H$ wherein R' is a monovalent aliphatic hydrocarbon radical of at least 6 carbon atoms and a compound of the formula $R'OSO_2OH$ wherein R' is as defined above, and sufficient water to form an oil-in-water emulsion. The mixture is immediately homogenized, then allowed to polymerize at a temperature of from about 15 to 30° C. for at least 5 hours at a pH of less than 5 until a crosslinked polymer is formed. The crosslinked polymer emulsion is then neutralized to a pH of greater than 7 and reinforced by adding greater than 1 part by weight of colloidal silica sol or silsesquioxane.

At the present time, it is considered that stable, silicone oil-in-water emulsions which are convertible to an elastomer upon removal of the water at room temperature, and which have the required solids content, are suitable for use in the method of this invention.

Ingredient (B) is greater than 5 parts by weight of an expanded vermiculite. Other lightweight fillers such as perlite, unexpanded vermiculite, and glass microspheres were evaluated, but the expanded vermiculite gave much better control of shrinkage during drying and less char depth formation during exposure of the composition to flame. Vermiculite is a hydrated mineral of the mica group which is heated to cause expansion of the mineral. The expanded material has a low density and a high porosity.

The expanded vermiculite was unique among the fillers tested in its ability to reduce shrinkage of the composition upon drying, reduce the depth of char formed upon exposure to flame, and leave a dense, adherent char.

Ingredient (C) is fiber selected from the group consisting of ceramic fiber and aramide fiber. The fibers were found to be necessary in the composition to prevent cracks forming in the surface of the composition during drying. The ceramic fibers also aid in producing a dense char which adheres to the surface of the composition when it is exposed to flame. Ceramic fibers include both glass fibers and refractory fibers having melting points above 2000° F. such as the fibers sold under the trademarks, "Fiberfrax" and "Refrasil". The preferred fibers are fibers having a melting point above 2000° F. so that they maintain their fibrous character during exposure to flame. The fibers are most effective when a broad variation in fiber lengths is present in the composition. A combinadtion of ceramic fibers having fiber lengths of less than 1 millimeter and ceramic fibers having lengths of at least 6 millimeters was found useful. The lengths given for the fibers are average lengths, the length of individual fibers can vary greatly from the average or mean length. For example, bulk ceramic fibers having a mean length of about 40 millimeters and having fibers as long as 100 millimeters were found to be a preferred fiber.

Another fiber which has been found useful is aramid fibers such as the fibers sold under the trademark, "Kevlar" by E. I. DuPont deNemours. The fibers had a diameter of about 0.01 millimeters. The aramid fibers are preferred as the short fibers in the composition because they disperse uniformly throughout the composition. Because of their lower density, compared to the ceramic fibers, a lower amount of the aramid fibers is required to prevent surface cracking than when ceramic fibers are used.

A combination of ceramic fibers having a mean length of greater than 30 millimeters and aramid fibers having a mean length of from 3 to 10 millimeters is a preferred composition for the fibers of (C).

The composition of this invention is produced by mixing the silicone emulsion (A), expanded vermiculite (B), and fibers (C) into a homogenous mixture in which the fibers are dispersed throughout the mixture. The viscosity and consistency of the composition are adjusted so that the composition is of a trowelable consistency and is non-slump. By trowelable is meant that the composition has sufficient viscosity that it can be handled with a common trowel as used in working with cement and plaster. The composition should be fluid enough to flow together when it is troweled into an opening, but should be viscous enough that it does not slump or flow on a vertical surface. A slump test applies a quantity of a material to a vertical surface, then measures the amount of flow. For purposes of this invention, a material is considered non-slump if it does not flow more than 5 millimeters.

The consistency of the composition can be adjusted by the inclusion of filler in the composition as well as the amount of fiber in the composition. The filler can be present as an ingredient of the silicone emulsion of (A) or it can be an added ingredient to the composition of this invention. Fillers such as fumed silica and diatomaceous earth which are considered reinforcing or semi-reinforcing fillers cause a greater increase in viscosity for a given weight than do non-reinforcing fillers such as ground quartz, clay, titanium dioxide, and calcium carbonate. The well-known fillers for silicone sealants which are finely formed or ground particles which do not interfere with the cure of the composition are suitable as fillers in this composition.

The silicone emulsion of (A) is required to have a solids content of greater than 50 percent by weight. The solids content of the emulsion can be due to the polydiorganosiloxane, surfactant, filler, and other minor ingredients. The composition of this invention adds greater than 5 parts by weight of an expanded vermiculite to the 100 parts by weight of the emulsion (A). The amount of expanded vermiculite required to give a useful composition depends to some extent upon the solids content of the emulsion (A). Preferred compositions contain from 5 to 15 parts of expanded vermiculite per 100 parts of emulsion (A) where the emulsion (A) is from 65 to 75 percent solids. The amount of vermiculite can be increased if a lower solids content emulsion is used. Greater than 0.2 part by weight of fiber is required in order to reinforce the char formed on exposure to fire and to prevent cracking during drying. A preferred amount of fiber is from 0.2 to 6 parts by weight with a preferred mixture of fiber being from 0.2 to 0.5 parts by weight of aramid fibers and from 1 to 5 parts by weight of ceramic fiber.

The composition of this invention is useful as a fire barrier. It is a one-component composition which is storable for long periods as long as it is kept in a closed container. A crack or opening in a fire wall can be closed by troweling the composition into the crack or opening to completely fill it and allowing the composition to dry. The dried composition fills the opening, sealing it from the passage of fumes or dirt particles. When exposed to fire, the dried composition does not burn, but forms a char on its surface which protects the composition under the char.

The following examples are included for illustrative purposes and should not be construed as limiting the invention which is properly set forth in the appended claims.

All parts are parts by weight.

COMPARATIVE EXAMPLE 1

A series of compositions were prepared to evaluate their ability to dry when applied in a thickness of 12 mm without cracking.

First, an aqueous anionic silicone emulsion which dried to an elastomer was prepared by mixing 82 parts of an anionic emulsion containing about 58 percent by weight of hydroxyl endblocked polydimethylsiloxane with 14 parts of a 50 percent by weight dispersion of colloidal silica having a surface area of about 150 $m^2/g$, organic tin catalyst, antifoam agent, freeze-thaw agent, and amine. This emulsion had a solids content of about 58 percent by weight with 100 parts of emulsion containing about 49.4 parts of the polydimethylsiloxane. This emulsion was then further compounded by mixing 61 parts of the emulsion with 37 parts of treated, finely divided, calcium carbonate filler, antifoam, and 1.8 parts of pigment. This coating material was about 72 percent solids by weight.

Portions of the coating material were then mixed with different amounts of ground quartz, untreated perlite, ball-milled ceramic fibers having a length of less than 1 mm and chopped ceramic fibers having a length of about 6 mm as shown in Table I. Each of these mixtures was formed into a layer about 12 mm thick and allowed to dry at room temperature. The sample with no fibers present (1) developed wide cracks as it dried in a layer of this thickness. The sample with only the 6 mm long fibers (2) developed surface cracks as it dried. The sample with both 6 mm long fibers and milled fibers (3) did not crack upon drying.

TABLE 1

|  | 1 | 2 | 3 |
|---|---|---|---|
| Emulsion |  |  |  |
| Coating material | 80 | 78 | 76 |
| perlite | 10 | 10 | 10 |
| ground quartz | 10 | 10 | 10 |
| milled ceramic fiber | — | 2 | 2 |
| 6 mm ceramic fiber | — | — | 2 |
| Composition, parts |  |  |  |
| polymer | 100 | 100 | 100 |
| silica | 14 | 14 | 14 |
| calcium carbonate | 118 | 118 | 118 |
| carbon black | 6 | 5.7 | 5.9 |
| perlite | 40 | 41 | 42 |
| ground quartz | 40 | 41 | 42 |
| milled ceramic fiber | — | — | 8.4 |
| 6 mm ceramic fiber | — | 8.2 | 8.4 |
| total filler | 198 | 214 | 216 |
| total fiber | — | 8.2 | 17 |
| solids content, % | 82 | 83 | 84 |
| Cured material |  |  |  |
| 12 mm section | wide cracks | surface cracks | no cracks |

COMPARATIVE EXAMPLE 2

A series of samples were prepared to evaluate their usefulnes as flame barriers where they would be exposed to flame for long periods of time so that relatively thick sections are needed.

Compositions were prepared using the parts of each ingredient shown in Table II. The emulsion is that used in Example 1, having a solids content of about 72 percent by weight, 31 percent by weight polymer, 4.35 percent by weight colloidal silica, 37 percent by weight calcium carbonate, and 1.8 percent by weight carbon black. The perlite is an expanded volcanic glass filler material having particle sizes ranging from less than 70 micrometres to greater than 0.6 mm with the mean size about 0.3 mm. The ground quartz had a nominal particle diameter of 5 micrometres. The ceramic fibers were bulk alumina-silica fibers having a melting point of about 1800° C., a mean diameter of about 2 to 3 micrometres, a mean length of about 40 millimeters with lengths up to 100 millimeters. The aramid fibers were about 6 millimeters long with a diameter of about 0.01 millimeters and a denier per filament of about 1.5 (9000 metres of filament weighs about 1.5 g).

The compositions were prepared by putting the emulsion in a container, then adding each ingredient and stirring with a spatula until the mixture appeared homogeneous.

Test samples were prepared by pouring the composition into a metal can 60 mm in diameter and 20 mm deep to fill the can. The composition was then allowed to dry for 1 month at 25° C. and 50% relative humidity.

The dried samples were then judged for cure cracking and shrinkage by comparing them with each other and assigning them a rating of 1 to 5 with 1 suggesting that the property is sufficient for the material to properly perform as a fire barrier, 2 suggests marginal performance, and 3 or greater suggesting that the material will not perform satisfactorily. In the evaluation;

```
cracking: 1, no cracks
          2, small hairline cracks
          3, narrow cracks, extending into sample
          4, wide cracks, extending into sample
          5, wide cracks, extending through sample
shrinkage: 1, less than 1 percent volume shrink
           2, 2 to 4 percent volume shrink
           3, 5 to 7 percent volume shrink
           4, 8 to 10 percent volume shrink
           5, greater than 10 percent volume shrink
```

The samples were then evaluated for resistance to flame by subjecting the surface of the sample to the flame of a propane torch for 15 minutes with the surface of the sample in a vertical position and the blue cone of the flame just touching the sample surface. The flame was at an angle to the sample surface of about 30°. The flame temperature was about 650° C. (1200° F.). After the sample had cooled to room temperature, the surface char was scraped off with a spatula down to the depth where the composition remained uncharred. The nature of the char was also noted and rated;

```
char depth:    1, nil (less than 5 millimeters)
               2, 5-10 mm
               3, 10-15 mm
               4, 15-20 mm
               5, 20 (extending through entire depth)
char strength: 1, hard, ceramic like, no cracks, held in place
               2, hard, ceramic like, cracks, held in place
               3, hard, ceramic like, loosely held
               4, dry, crumbly pieces, loosely held
               5, dry powder, loosely held
```

The samples containing the ceramic fiber at the 5.2 parts level or both ceramic fiber and aramid fiber were crack free, but unsatisfactory because of too much shrinkage, too deep a char depth, and insufficient char strength.

TABLE 2

| Sample | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Emulsion | 100 | 100 | 100 | 100 | 100 | 100 | 100 | 100 | 100 | 100 | 100 | 100 | 100 | 100 |
| perlite | 13.2 | 13.2 | 13.2 | 13.2 | 13.2 | 13.2 | 13.2 | 13.2 | 13.2 | 6.6 | 13.2 | 6.6 | 6.6 | 13.2 |
| quartz | 13.2 | 13.2 | 13.2 | 13.2 | 13.2 | — | — | — | 26.4 | 26.4 | 26.4 | — | — | 13.2 |
| ceramic fiber | 2.6 | 2.6 | 1.3 | — | — | — | 2.6 | 5.2 | 2.6 | 2.6 | — | 5.2 | 5.2 | 2.6 |
| aramid fiber | 0.3 | — | 0.3 | 0.3 | — | — | 0.3 | — | 0.3 | 0.3 | 0.3 | — | 0.3 | 0.4 |
| Cracks | 1 | 5 | 2 | 2 | 5 | 5 | 1 | 1 | 1 | 1 | 1 | 1 | 1 | 1 |
| Shrinkage | 5 | 5 | 5 | 5 | 5 | 5 | 3 | 4 | 4 | 5 | 5 | 5 | 5 | 4 |
| Char Depth | 4 | 3 | 2 | 4 | 4 | 5 | 3 | 4 | 3 | 3 | 4 | 4 | 3 | 4 |
| Char Strength | 3 | 3 | 3 | 5 | 5 | 4 | 3 | 3 | 2 | 2 | 4 | 3 | 3 | 3 |

COMPARATIVE EXAMPLE 3

A series of comparative examples were prepared to determine the effect of using different silicone emulsions as part (A). In this series, 100 parts of emulsion was mixed with 13.2 parts of the perlite and 13.2 parts of the ground quartz of Example 2. There were no fibers in these compositions.

Emulsion 1 was the emulsion of Example 1.

Emulsion 2 was an anionically stabilized silicone emulsion having a solids content of about 42 percent by weight with 8.7 parts of colloidal silica filler per 100 parts of polymer.

Emulsion 3 was an anionically stabilized silicone emulsion having a solids content of about 48 percent by weight with 14 parts of colloidal silica filler and 24.4 parts of titanium dioxide filler per 100 parts of polymer.

Emulsion 4 was an anionically stabilized silicone emulsion having a solids content of about 76 percent by weight with 3.7 parts of colloidal silica, 4.7 parts of titanium dioxide, and 151 parts of calcium carbonate per 100 parts of polymer. This emulsion was of a paste consistency.

Each composition was made into test samples and evaluated as in Example 2 with the results shown in Table III. The emulsions having the low solids content (2 and 3) showed less shrinkage. The samples having the highest filler loading (4 and 5) were not the best for cracks and shrinkage as might be expected. Sample 5, having a high loading of ground quartz gave much better char strength than Sample 4 having a high loading of calcium carbonate filler in the emulsion.

TABLE 3

| Sample | 1 | 2 | 3 | 4 | 5 | 6 |
|---|---|---|---|---|---|---|
| Emulsion 1 | 100 | | | | | 100 |
| Emulsion 2 | | | 100 | | | |
| Emulsion 3 | | 100 | | | 100 | |
| Emulsion 4 | | | | 100 | | |
| perlite | 13.2 | 13.2 | 13.2 | 13.2 | 13.2 | 13.2 |
| quartz | 13.2 | 13.2 | 13.2 | 13.2 | 111.2 | — |
| Cracks | 5 | 5 | 4 | 5 | 5 | 3 |
| Shrinkage | 5 | 1 | 1 | 5 | 5 | 5 |
| Char Depth | 5 | 5 | 5 | 5 | 5 | 5 |
| Char Strength | 5 | 5 | 3 | 4 | 1 | 4 |
| solids content, % | 83 | 60 | 60 | 86 | 80 | 81 |
| filler, parts | 216 | 115 | 84 | 247 | 399 | 180 |

EXAMPLE 1

A series of compositions was prepared using different types of particulate fillers having voids in the filler particles.

The compositions were prepared by mixing the emulsion of Example 1 with the particulate fillers shown in Table IV and the ceramic fibers and aramid fibers of Example 2.

The unexpanded vermiculite was purchased from W. R. Grace Co. under the designation LTEV-4. It was particles in the form of platelets having a diameter of about 0.5 to 1.0 millimeters.

The glass micro spheres were purchased from 3M under the designation B-25-B. They are hollow glass beads having a diameter from about 20 micrometres to 130 micrometres. They are a fluffy, free-flowing powder having a bulk density of about 0.15 g/cc.

The expanded vermiculite was purchased from Stronglite Products. It was in the form of cylindrical particles having a diameter of about 0.5 to 1.0 millimeters in diameter with a height of about 1.0 millimeters.

Each composition was prepared and made into test samples and tested as in Example 2, with the results shown in Table 4.

Each composition, containing ceramic fibers, aramid fibers, and ground quartz, in addition to the particulate filler having voids, yielded samples which did not have surface cracks. The samples made with expanded vermiculite gave less shrinkage, less char depth, and greater char strength than the samples made with unexpanded vermiculite or glass micro spheres. The Samples 3 and 4 containing emulsion, expanded vermiculite, ceramic fiber, and aramid fiber gave compositions which dried to produce a material which is useful as a fire barrier.

TABLE 4

| Sample | 1 | 2 | 3 | 4 |
|---|---|---|---|---|
| Emulsion | 100 | 100 | 100 | 100 |
| Unexpanded vermiculite | 13.2 | — | — | — |
| Glass micro-spheres | — | 13.2 | — | — |
| Expanded vermiculite | — | — | 13.2 | 6.4 |
| quartz | 13.2 | 13.2 | 13.2 | 13.2 |
| ceramic fiber | 2.6 | 2.6 | 2.6 | 2.6 |
| aramid fiber | 0.4 | 0.4 | 0.4 | 0.4 |
| Cracks | 1 | 1 | 1 | 1 |
| Shrinkage | 5 | 5 | 1 | 2 |
| Char Depth | 4 | 4 | 1 | 2 |
| Char Strength | 3 | 5 | 1 | 2 |

That which is claimed is:

1. A composition, useful as a fire barrier, consisting essentially of a mixture of
   (A) 100 parts by weight of an anionically stabilized silicone emulsion which is an aqueous, oil-in-water emulsion that cures upon drying at ambient temperature to an elastomeric film, the emulsion having a solids content of greater than 50 percent by weight,
   (B) greater than 5 parts by weight of an expanded vermiculite, and
   (C) greater than 0.2 parts by weight of fiber selected from the group consisting of ceramic fiber and aramid fiber,
   the composition being an emulsion having a viscosity such that it is trowelable and non-slump and capable of producing a cured, continuous fire barrier at a thickness of 10 mm when the water is removed at room temperature.

2. The composition of claim 1 in which the silicone emulsion consists essentially of a dispersed phase of hydroxyl endblocked polydiorganosiloxane and colloidal silica, and a continuous phase of water and optionally particulate filler and optionally organic tin compound.

3. The composition of claim 1 in which the fibers of (C) consist of a mixture of ceramic fibers having fiber lengths of from less than 1 millimeter to at least 6 millimeters.

4. The composition of claim 1 in which the fibers of (C) consist of a mixture of ceramic fibers having a mean length of greater than 30 millimeters and aramid fibers having a mean length of from 3 to 10 millimeters.

5. The composition of claim 2 in which the fibers of (C) consist of a mixture of fibers having lengths of from less than 1 millimeter to at least 6 millimeters.

6. The composition of claim 5 in which the fibers of (C) consist of a mixture of ceramic fibers having a mean length of greater than 30 millimeters and fibers selected from ceramic fibers or aramid fibers, said fibers having a mean length of from 3 to 10 millimeters.

7. The material produced by drying the composition of claim 1.

8. The material produced by drying the composition of claim 2.

9. The material produced by drying the composition of claim 5.

10. The material produced by drying the composition of claim 6.

11. A composition, useful as a fire barrier, consisting essentially of a mixture of
    (A) 100 parts by weight of an anionically stabilized silicone emulsion which is an aqueous, oil-in-water emulsion that cures upon drying at ambient temperature to an elastomeric film, the emulsion having a solids content of greater than 50 percent by weight,
    (B) from 5 to 15 parts by weight of an expanded vermiculite, and
    (C) from 0.2 to 6 parts by weight of fiber selected from the group consisting of ceramic fiber and aramid fiber,
    the composition being an emulsion having a viscosity such that it is trowelable and non-slump and capable of producing a cured, continuous fire barrier at a thickness of 10 mm when the water is removed at room temperature.

* * * * *